(12) United States Patent
Kempf et al.

(10) Patent No.: US 11,365,950 B1
(45) Date of Patent: Jun. 21, 2022

(54) SPRING LOADED ACCESSORY MOUNT AND MEANS

(71) Applicants: James J. Kempf, Coralville, IA (US); Rex E. Isenhower, Stanwood, IA (US); Randy Kitts, Ball Ground, GA (US)

(72) Inventors: James J. Kempf, Coralville, IA (US); Rex E. Isenhower, Stanwood, IA (US); Randy Kitts, Ball Ground, GA (US)

(73) Assignee: ARCHERY INNOVATORS, LLC, Tiffin, IA (US)

( * ) Notice: Subject to any disclaimer, the term of this patent is extended or adjusted under 35 U.S.C. 154(b) by 268 days.

(21) Appl. No.: 16/732,429

(22) Filed: Jan. 2, 2020

(51) Int. Cl.
| | |
|---|---|
| *A45F 5/02* | (2006.01) |
| *F41B 5/14* | (2006.01) |
| *F16M 13/02* | (2006.01) |
| *F16M 13/04* | (2006.01) |
| *F41B 5/06* | (2006.01) |

(52) U.S. Cl.
CPC .............. *F41B 5/148* (2013.01); *A45F 5/021* (2013.01); *F16M 13/02* (2013.01); *F16M 13/04* (2013.01); *F41B 5/063* (2013.01); *F41B 5/066* (2013.01)

(58) Field of Classification Search
CPC .............. A45F 5/021; A45F 2200/0566; A45F 2005/025; F41C 33/045; Y10T 16/54038
USPC ................. 224/916, 197, 666–667, 671–673
See application file for complete search history.

(56) References Cited

U.S. PATENT DOCUMENTS

| | | | | |
|---|---|---|---|---|
| 3,168,971 A * | 2/1965 | Goertzen | ............. | F41B 5/1461 224/247 |
| 4,121,743 A * | 10/1978 | Burton | ................. | F41B 5/1461 224/271 |
| 4,504,001 A * | 3/1985 | Nichols | ................. | F41C 33/045 224/198 |
| 5,167,355 A * | 12/1992 | Hill | ............ | A45F 5/00 224/193 |
| 5,239,976 A * | 8/1993 | Specht | .................. | F41B 5/1461 124/23.1 |
| 5,564,610 A * | 10/1996 | Barron | ...................... | A45F 5/00 224/197 |
| 5,699,943 A * | 12/1997 | Schaefer | ................... | A45F 5/02 362/108 |
| 5,833,100 A * | 11/1998 | Kim | .................... | B60R 11/0241 224/667 |
| 6,550,655 B2 * | 4/2003 | Warner | ...................... | A45F 5/02 224/271 |
| 8,631,980 B2 * | 1/2014 | Youssefi-Shams | ..... | A45F 5/021 224/617 |
| 8,939,482 B2 * | 1/2015 | Rasmussen | ............. | A45F 5/102 294/25 |
| 9,016,531 B2 * | 4/2015 | Paugh | ................... | B65H 75/48 224/668 |
| 9,622,557 B1 * | 4/2017 | Beavers | .................... | A45F 5/00 |
| 10,765,236 B2 * | 9/2020 | Quinter | .................. | A47F 10/06 |
| 10,948,258 B1 * | 3/2021 | Kitts | ..................... | F41B 5/1453 |
| 2003/0006259 A1 * | 1/2003 | Campana | .................. | A45F 5/00 224/268 |

\* cited by examiner

*Primary Examiner* — Adam J Waggenspack

(74) *Attorney, Agent, or Firm* — Donald J. Ersler

(57) ABSTRACT

An accessory mount having a plurality of uses and mounting provisions wherein an accessory may be operably removed and engaged with the accessory mount. The accessory mount may be worn on a belt or engaged with any end use article, such as a bow, a tree, a tree stand. The accessory mount shall have radial indexing provisions, allowing a receiver to rotate about the axis of the provisions.

16 Claims, 10 Drawing Sheets

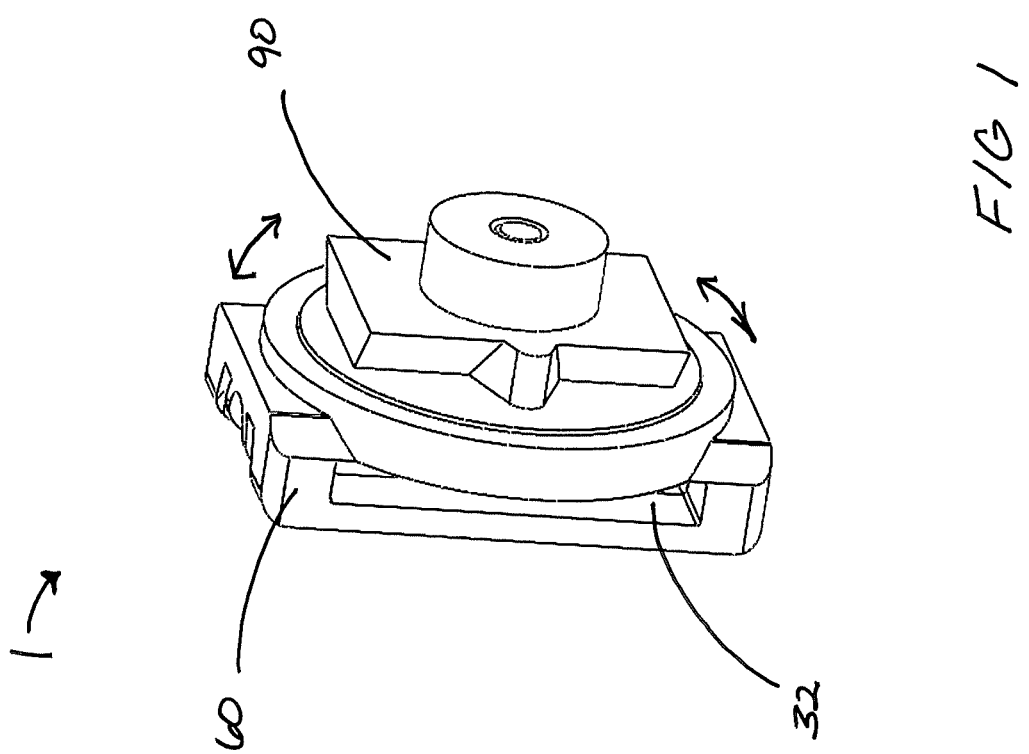

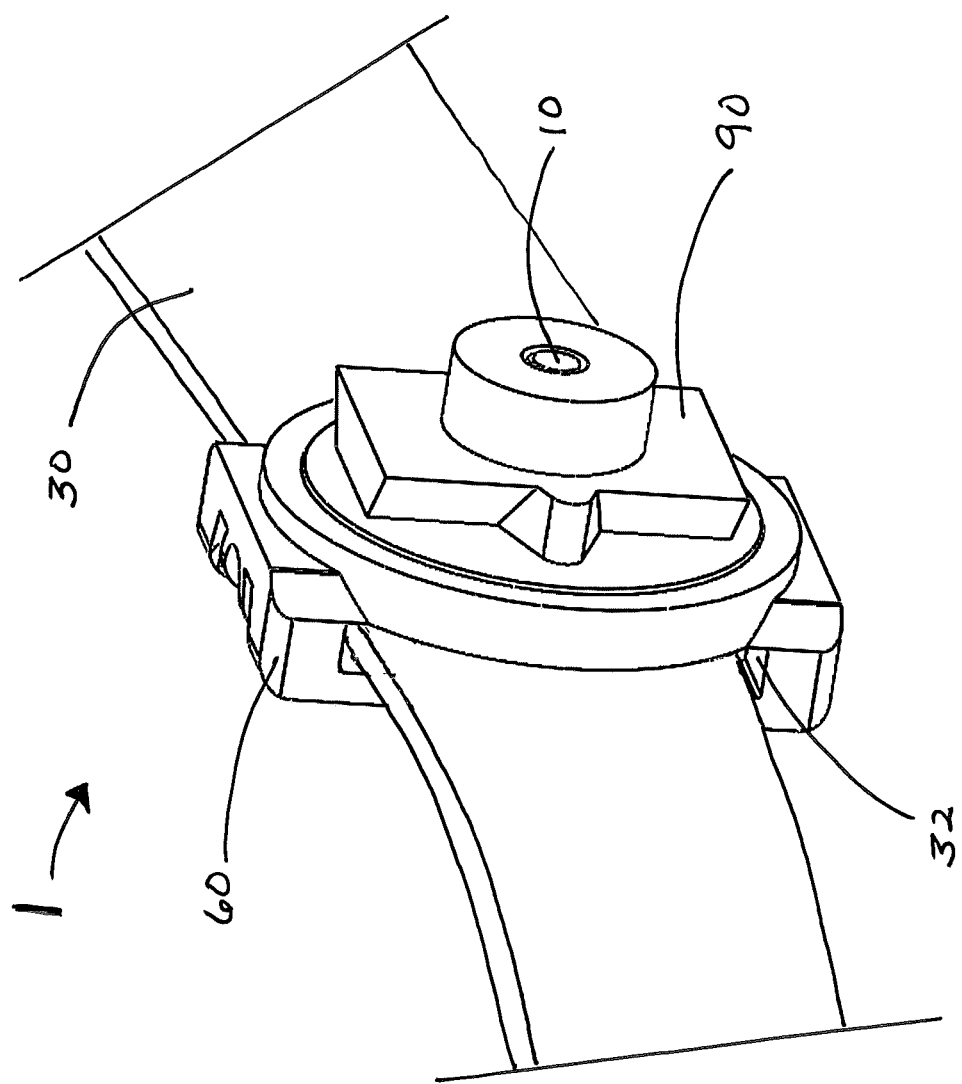

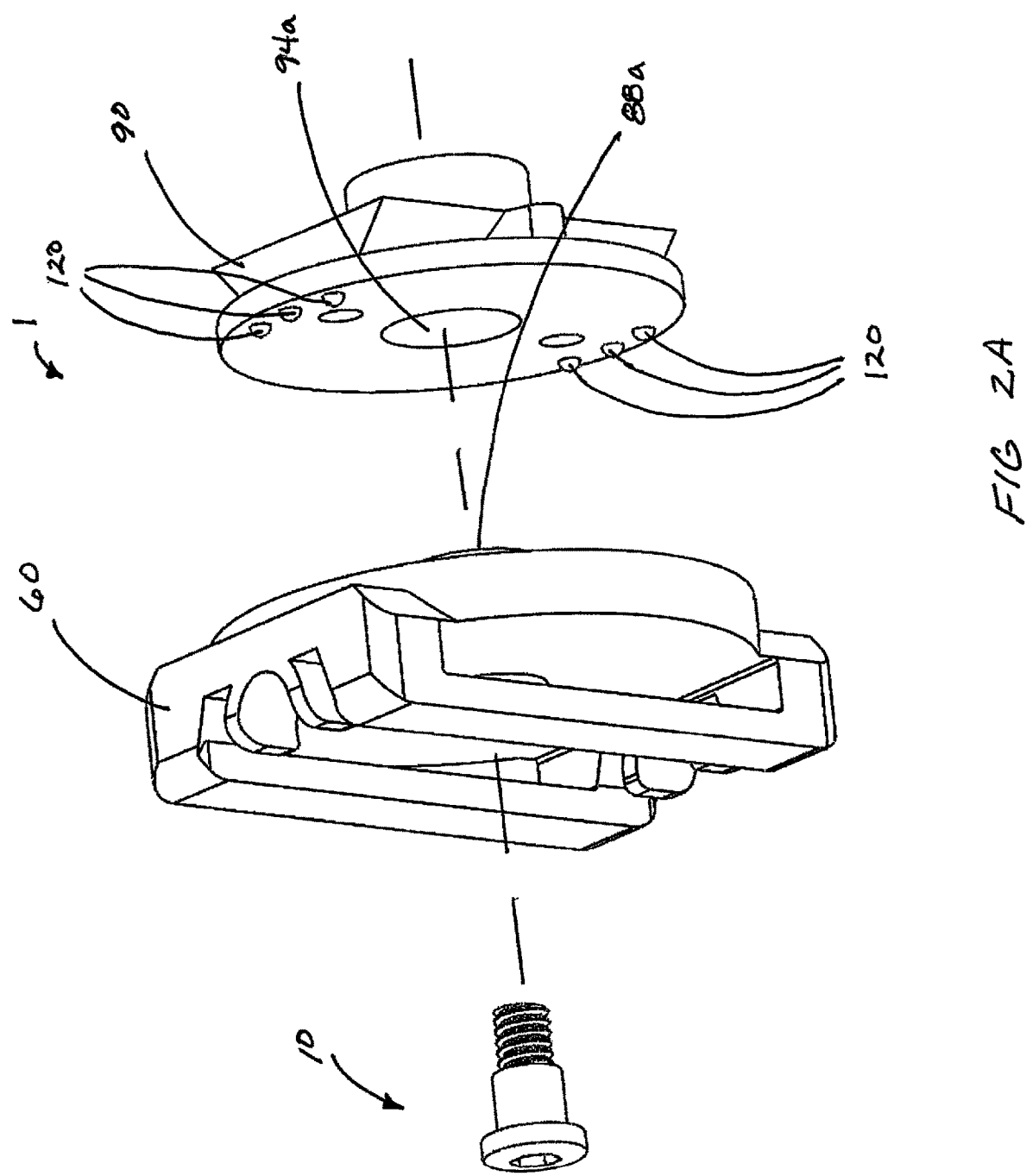

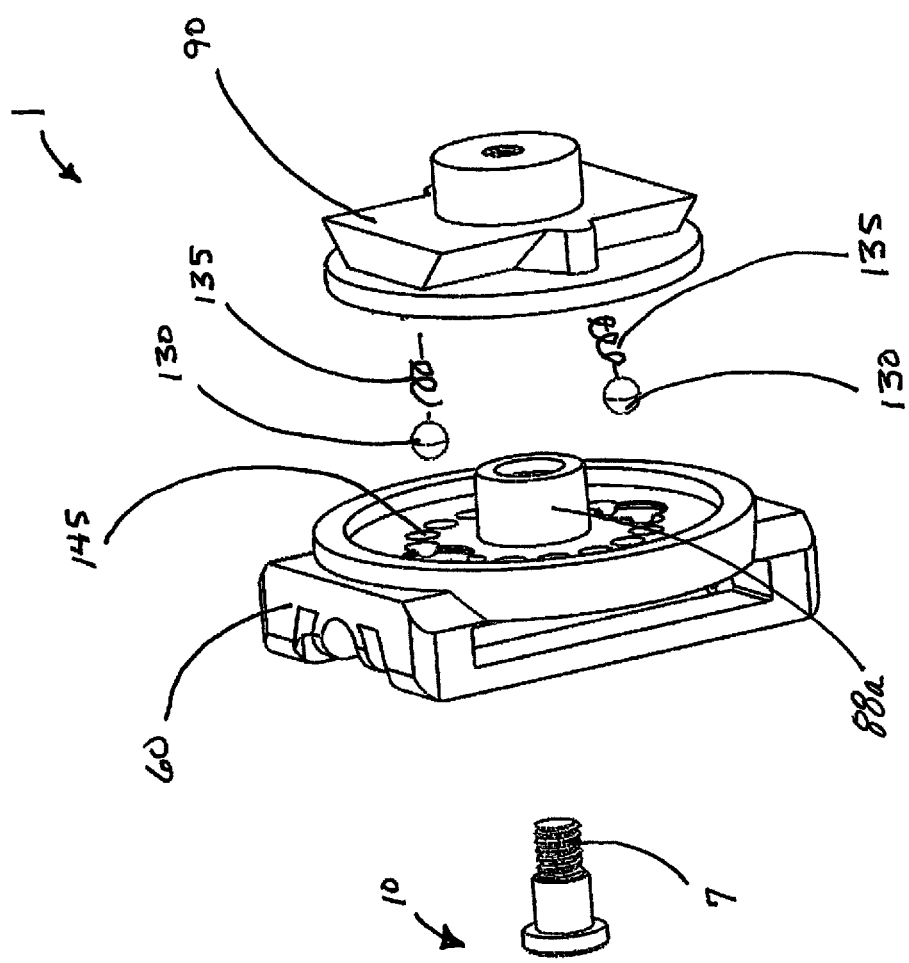

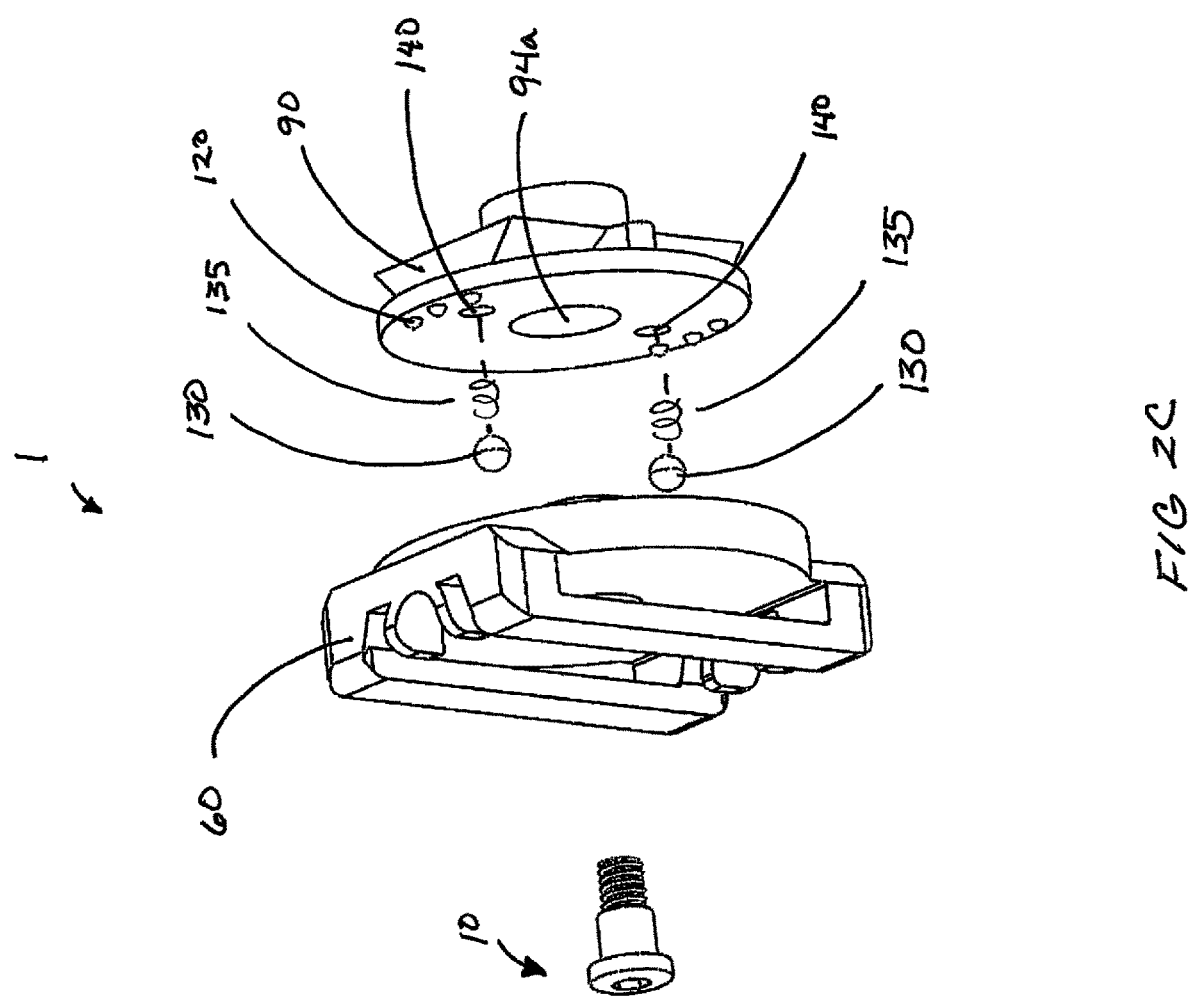

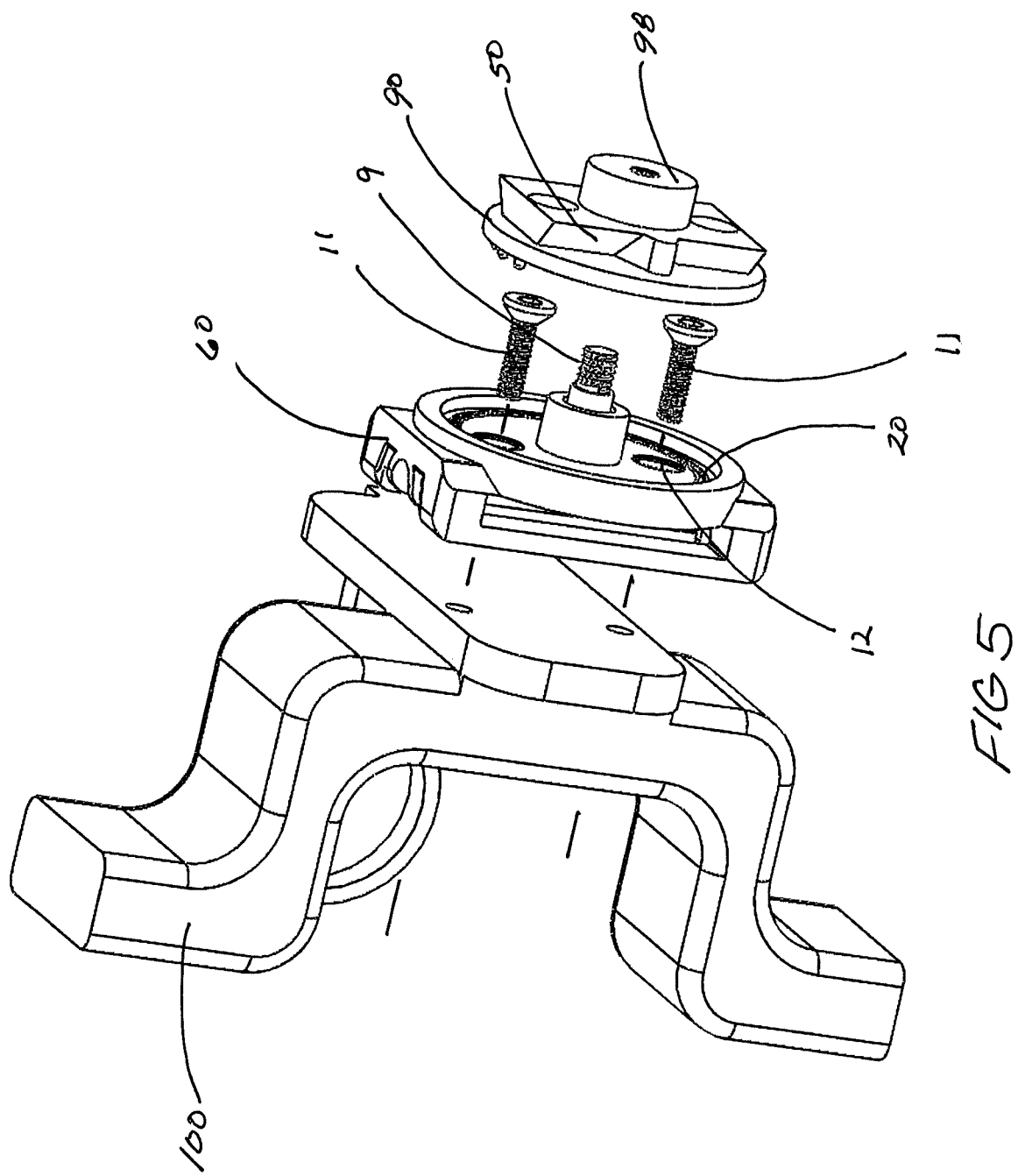

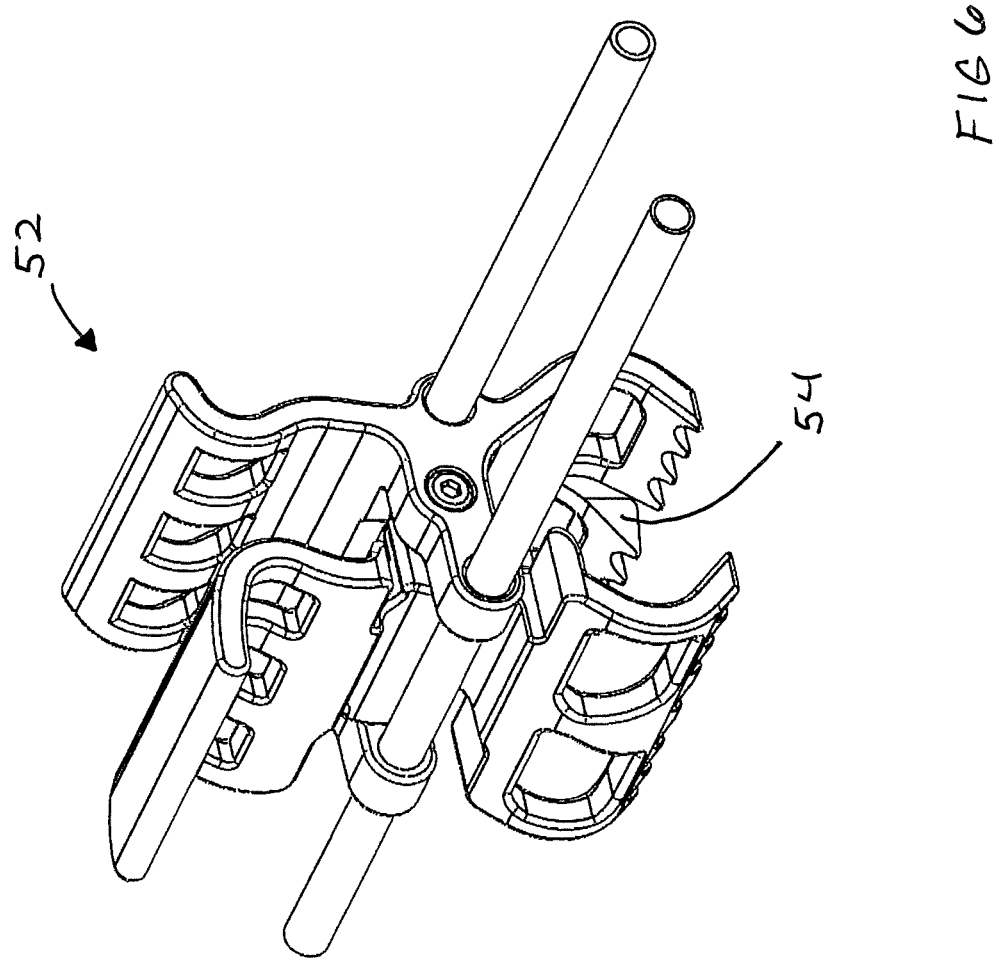

SPRING LOADED ACCESSORY MOUNT AND MEANS

BACKGROUND OF THE INVENTION

1. Field of the Invention

The present invention in its preferred embodiment relates generally to archery and more specifically to a multi-functional accessory mount for an archery accessories or other object such as an archery quiver. The present invention may be used with any type of accessory where there is a desire to provide a selectively engagement, disengagement, and rotation of a first object with a third object through the means of a second object, wherein the first object may be an accessory mount, the third object may be an accessory, and the second object may be a means for engaging the third object with the first object.

2. Discussion of the Prior Art

Historically, archery quiver mounts have been used by archers to hold and transport arrows, until the archer is ready to use them. Over the years, many different styles have been produced. The most versatile style is a kind of quiver that attaches to the archery bow or crossbow, and has a quick-release feature that allows for removal of the quiver from the hunting device. Quiver mounts designed to hold quivers have always had inherent restrictions placed upon them due to the design and function of the mount. A quiver mount would either mount the quiver to a bow or crossbow, or sometimes even to a tree or tree stand, but the mount was still limited in versatility.

Other accessory mounts for non-archery items saw similar limitations to use and function.

Although the prior art accomplishes the task of securing the quiver to a bow or crossbow, they are all limited in the versatility of mounting locations and lack the function of full rotation of the mounting head of the mounting bracket in one simple step.

Accordingly, there is a clearly felt need in the art for a spring loaded rotate-able mounting head accessory mounting bracket that may be engaged with many objects and allow the accessory to be select-ably rotated 360 degrees on the mount in one easy step.

SUMMARY OF THE INVENTION

The present invention provides an archery accessory mounting bracket assembly that may be directly mounted (with fasteners) to an archery bow or crossbow; may be hung to a tree via a belt; and may be worn by an individual via a belt. The spring loaded archery accessory mounting bracket assembly of the disclosure may be manufactured allowing three hundred sixty degrees of rotation of the mount, a first radial indexing provision on a first surface and a second radial indexing provision on a second surface, allowing for proper alignment of the archery accessory.

The spring loaded archery accessory mounting bracket assembly may be sized as to allow a users belt to pass through an opening, as to allow the belt to hold the spring loaded archery accessory mounting bracket assembly in a desired location, such as on the individual, or around an object such as a tree, tree stand, or hunting blind. The spring loaded archery accessory mounting bracket assembly may be manufactured as to allow three hundred sixty degrees of rotation of the archery accessory. In the preferred embodiment, a spring loaded archery accessory mounting bracket assembly would include a base having a first radial indexing provision on a first surface, a head having a second radial indexing provision on a second surface, a compression spring, and a coupling fastener. The spring loaded archery accessory mounting bracket base includes a spring pocket, a first radial indexing provision on a first surface, and mounting provisions. The spring loaded archery accessory mounting bracket head would include jaw engagement surfaces, a second radial indexing provision on a second surface, a spring pocket receiver pocket, and holes for mounting fasteners. The coupling fastener has a fastener head having a first diameter, a neck having a second diameter smaller than the first diameter, and a coupling means such as threads. The compression spring has an outer diameter that is less than the first diameter, and an in diameter that is greater than the second diameter, and is axial too the coupling fastener, and biases the base towards the head. The spring loaded archery accessory mounting bracket head is rotatable about the axis of the coupling fastener. The coupling fastener would couple the spring loaded archery accessory mounting bracket head with the spring loaded archery accessory mounting bracket base.

The coupling fastener is inserted into the compression spring until a first end of the compression spring rests against the fastener head. The compression spring and the coupling fastener are inserted into the spring pocket of the spring loaded archery accessory mounting bracket base until a second end of the compression spring rests against the inner surface of the spring pocket, wherein the coupling means of the coupling fastener extends beyond the outer surface of the spring loaded archery accessory mounting bracket base spring pocket. The spring loaded archery accessory mounting bracket head is axially engaged with the coupling means of the coupling fastener.

The outer surface of the spring loaded archery accessory mounting bracket base spring pocket is axial to, and engages inner surface of the spring loaded archery accessory mounting bracket head spring pocket receiver pocket.

The spring loaded archery accessory mounting bracket radial indexing provisions engage the spring loaded archery accessory mounting bracket head radial indexing provisions. The compression spring biases the outer surface of the spring loaded archery accessory mounting bracket base spring pocket with the inner surface of the spring loaded archery accessory mounting bracket head spring pocket receiver pocket and the spring loaded archery accessory mounting bracket base radial indexing provisions with the spring loaded archery accessory mounting bracket head radial indexing provisions.

In use, a first object, the spring loaded archery accessory mounting bracket assembly base is coupled with a desired object such as a bow, an individual would pull on the third object (the accessory), or the second object (the means for engaging the accessory), rotate the third or the second object to the desired position, and release the third or the second object. The spring loaded archery accessory mounting bracket head radial indexing provision engage the spring loaded archery accessory mounting bracket base radial indexing provision, preventing unwanted rotation of the third object or the second object. A user may also rotate only the the spring loaded archery accessory mounting bracket head in the same manner outlined above, if no accessory is attached with the spring loaded archery accessory mounting bracket head.

Accordingly, it is an object of the present invention to provide a spring loaded archery accessory mounting assembly that allows for multiple types and positions of mounting an archery accessory.

It is another object of the present invention to provide a spring loaded archery accessory mounting accessory that allows for three hundred sixty degrees of rotation of an archery accessory about the mounting base.

Finally, it is another object of the present invention to provide a spring loaded accessory mount having a plurality of uses and mounting provisions wherein an accessory may be operably removed and engaged with the accessory mount. The accessory mount may be worn on a belt or engaged with any end use article, such as a bow, a tree, a tree stand.

These and additional objects, advantages, features and benefits of the present invention will become apparent from the following specification.

BRIEF DESCRIPTION OF THE DRAWINGS

FIG. 1 is a front perspective view of a spring loaded archery accessory mounting assembly in accordance with the present invention.

FIG. 1A is a front perspective view of a spring loaded archery accessory mounting assembly engaged with a belt in accordance with the present invention.

FIG. 2A is partially exploded view of an alternate embodiment spring loaded archery accessory mounting assembly having ball detents in accordance with the present invention.

FIG. 2B is partially exploded view of an alternate embodiment spring loaded archery accessory mounting assembly having ball detents in accordance with the present invention.

FIG. 2C is partially exploded view of an alternate embodiment spring loaded archery accessory mounting assembly having ball detents in accordance with the present invention.

FIG. 5 is an exploded view of a spring loaded archery accessory mounting assembly engaging with a bow riser in accordance with the present invention.

FIG. 6 is a perspective view of a representative jaw assembly, the jaw assembly used for mounting an archery accessory to the jaws, wherein the jaws engage the archery accessory mounting bracket in accordance with the present invention.

DETAILED DESCRIPTION OF THE PREFERRED EMBODIMENTS

Figure 2:
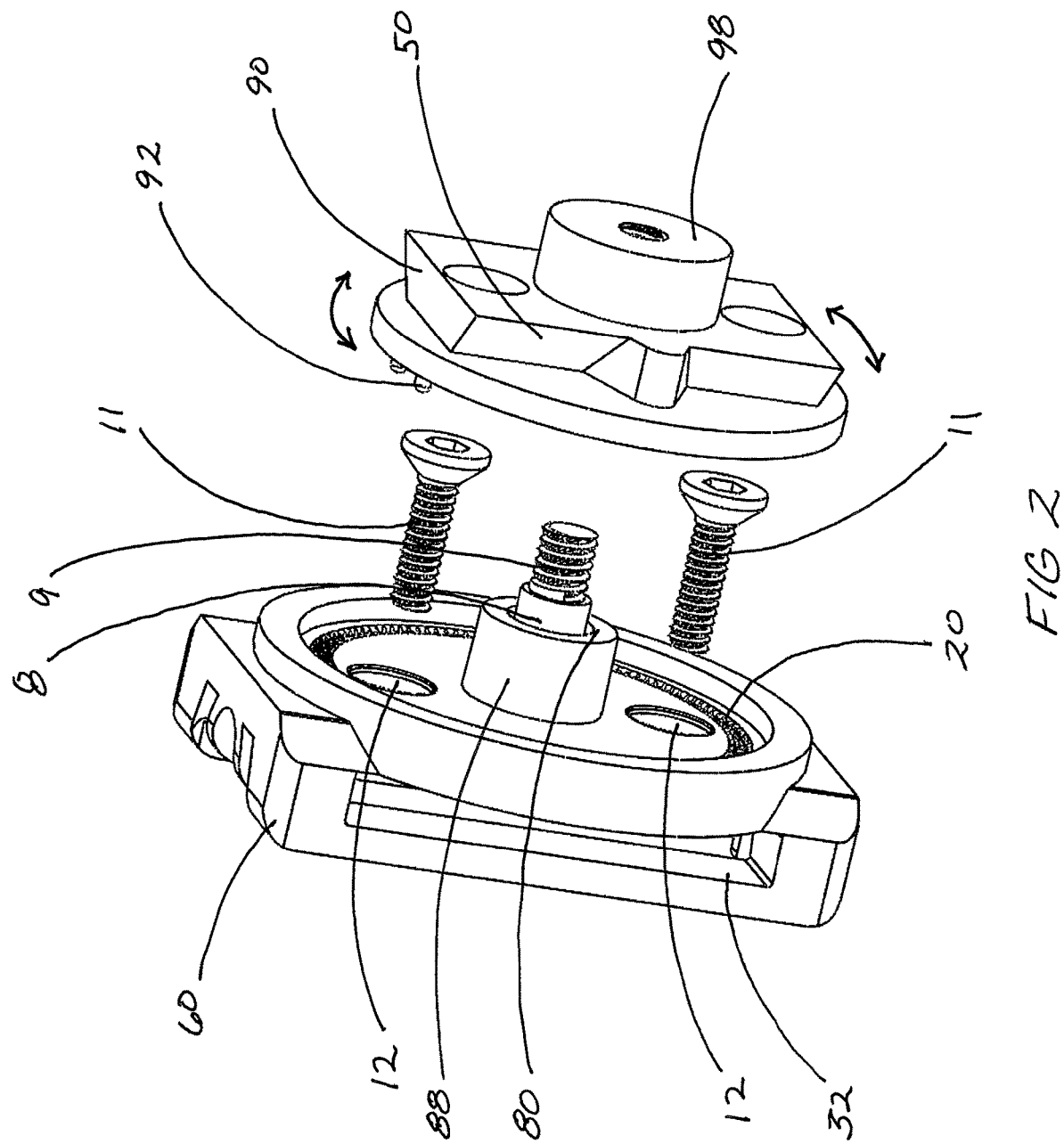
FIG. 2 is a perspective partially exploded view of a spring loaded archery accessory mounting assembly in accordance with the present invention.

FIGS. 1 thru 5 disclose a spring loaded archery accessory mounting assembly 1 in accordance with the present invention. The spring loaded archery accessory mounting assembly 1 may include at least one first fastener opening 12, a pair of belt receiver openings 32, an archery accessory mounting bracket jaw engagement surface (engagement block) 50, and an end use article engagement surface 68.

FIG. 1A discloses a spring loaded archery accessory mounting assembly 1. A pair of belt receiver openings 32 are formed through a rear of the spring loaded archery accessory mounting base 60 to receive a belt 30. The belt 30 is passed through the pair of belt receiver openings. The belt receiver opening 32 may be sized for different sizes of belts 30. The belt 30 may be engaged with a user, a tree, a bow riser 100 or any such object desirable for attaching the spring loaded archery accessory mounting assembly 1 too.

The spring loaded archery accessory mounting bracket assembly 1 may include a base 60, at least a first fastener opening 12, a first radial indexing provision 20, and a belt receiver opening 32. A three hundred sixty degree rotatable spring loaded archery accessory mounting head (accessory mounting head) 90 may include at least a first fastener opening 12, an opening axial to and sized to engagement means 9, a second radial indexing provision 92, and archery accessory mounting bracket jaw engagement surface 50. The three hundred sixty degree rotatable spring loaded archery accessory mounting head 90 is rotatable about the axis of the coupling means 10. The first radial indexing provision 20 and the second radial indexing provision 92 may be of any method known in any art, such as a spring loaded ball detent, opposing teeth, pockets and the like. Further, the coupling means 10 may be one of any method known in the art to axially couple objects one with another, such as shafts, pins, axles, compression fittings and the like.

FIG. 6 illustrates a type of archery accessory mounting jaw assembly 52 known in the art. The jaw assembly 52 has an archery accessory mounting bracket engagement surface 54, engage-able with the spring loaded archery accessory mounting head 90. Many types of accessories may be engaged with the jaw assembly 52 and the jaw assembly 52 may be engaged with the spring loaded archery accessory mounting head 90.

Figure 3:
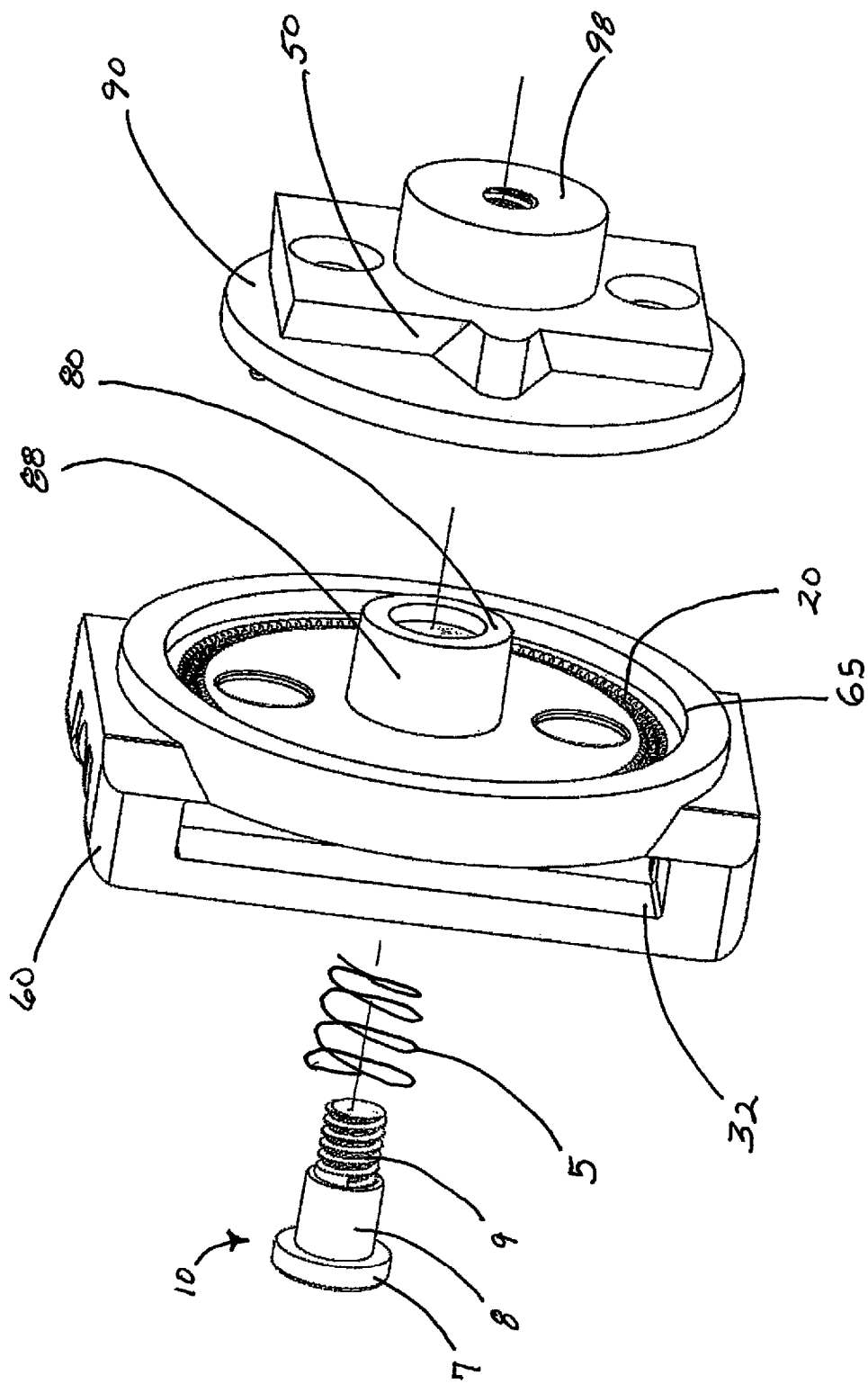
FIG. 3 is a perspective partially exploded view of a spring loaded archery accessory mounting assembly in accordance with the present invention.
Figure 4:
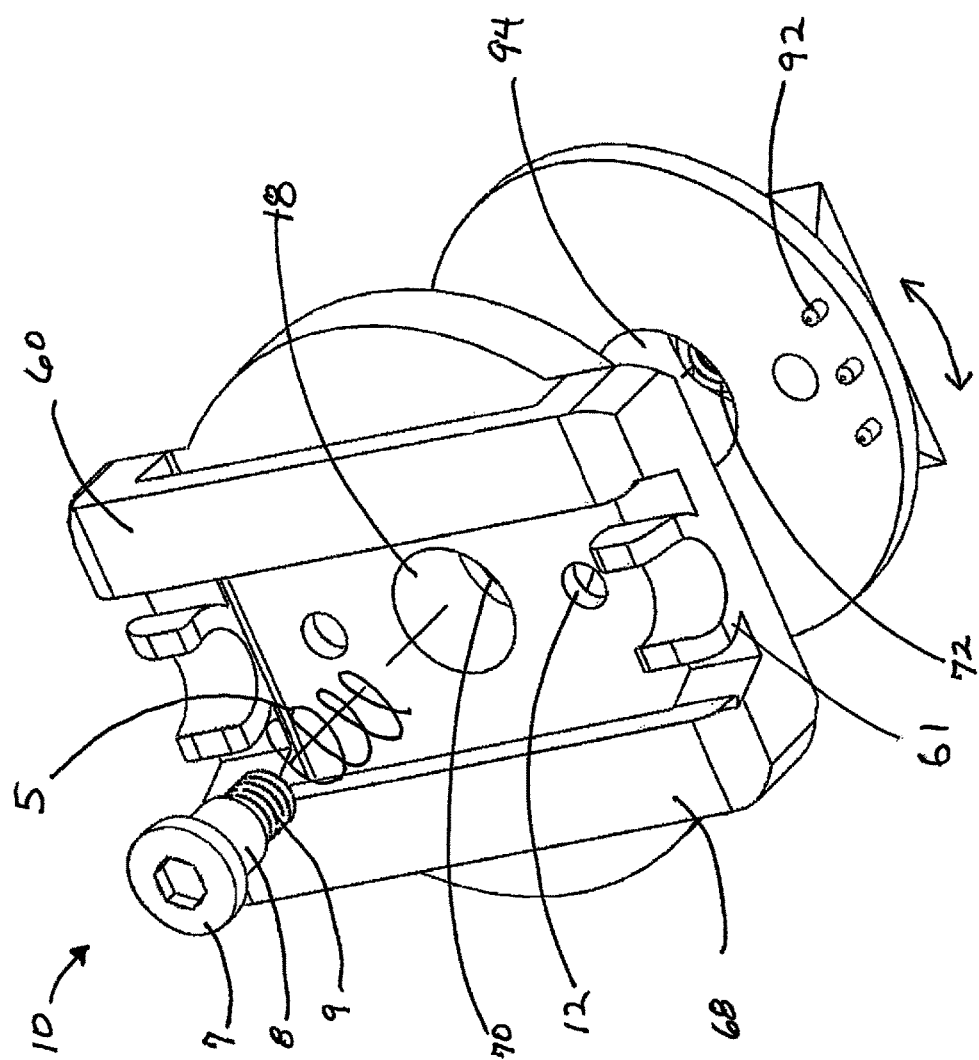
FIG. 4 is a perspective exploded view of a spring loaded archery accessory mounting assembly in accordance with the present invention.

With reference to FIG. 3, the spring loaded archery accessory mounting assembly 1 may be manufactured as to allow three hundred sixty degrees of rotation of an archery accessory. In the preferred embodiment and with reference to FIG. 4, a spring loaded archery accessory mounting assembly 1 would include a spring loaded archery accessory mount base 60, a spring loaded archery accessory mount head 90, a compression spring 5, and a coupling means 10. The spring loaded archery accessory mounting bracket base 60 includes a spring pocket 18, first indexing provision 20, and mounting provisions 12. The spring loaded archery accessory mounting bracket head 90 would include jaw engagement surfaces 50, second indexing provision 92, a spindle bore 94, and holes for mounting fasteners 11. The coupling means 10 has a fastener head 7 having a first diameter, a neck 8 having a second diameter smaller than the first diameter, and an engaging means 9 such as threads. The compression spring 5 has an outer diameter that is less than the first diameter, and an in diameter that is greater than the second diameter, and is axial too the coupling means 10, and biases the spring loaded archery accessory mounting base 60 towards the spring loaded archery accessory mounting head 90. The spring loaded archery accessory mounting bracket head 90 is rotatable about the axis of the coupling means 10. It is preferable to form a bracket head counterbore 65 in a front of the spring loaded archery accessory mount base 60 to receive an outer diameter of the spring loaded archery accessory mounting bracket head 90. The coupling means 10 would couple the spring loaded archery accessory mounting bracket head 90 with the spring loaded archery accessory mounting bracket base 60.

The coupling means 10 is inserted into the compression spring 5 until a first end of the compression spring rests against the fastener head 7. The compression spring 5 and the coupling means 10 are inserted into the spring pocket 18 of a raised spindle 88 of the spring loaded archery accessory mounting bracket base 60 until a second end of the compression spring rests against the inner surface of the spring pocket 70, wherein the coupling means 7 of the coupling means 10 extends beyond the outer surface 80 of the raised spindle 88 of the spring loaded archery accessory mounting bracket base spring pocket 18. The spring loaded archery accessory mounting bracket head 90 is axially engaged with the coupling means 10. The spindle bore 94 is sized to rotatably receive the raised spindle 88.

The outer surface of the spring loaded archery accessory mounting bracket base spring pocket 18 is axial to and engages inner surface of the spring loaded archery accessory mounting bracket head spring pocket receiver pocket 94a.

The spring loaded archery accessory mounting bracket base radial indexing provision 20 engage the spring loaded archery accessory mounting bracket head radial indexing provision 92. The compression spring 5 biases the outer surface of the spring loaded archery accessory mounting bracket base spring pocket 80 with the inner surface of the spring loaded archery accessory mounting bracket head spring pocket receiver pocket 72 and the spring loaded archery accessory mounting bracket base radial indexing provision 20 with the spring loaded archery accessory mounting bracket head radial indexing provision 92.

In use, a first object, the spring loaded archery accessory mounting bracket base 60, is coupled with a desired object such as a bow. An individual would pull outward on the third object (the accessory), or the second object (the means for engaging the accessory) 52, disengaging the first radial indexing provision 20 from second radial indexing provision 92, rotate the third object or the second object 52 axial to the coupling means 10 to the desired position, and release the third or the second object 52, re-engaging the first radial indexing provision 20 from second radial indexing provision 92. The spring loaded archery accessory mounting bracket head radial indexing provision 92 engage the spring loaded archery accessory mounting bracket base radial indexing provision 20, preventing unwanted rotation of the third object or the second object 52. A user may also rotate only the spring loaded archery accessory mounting bracket head 90 in the same manner outlined above, if no accessory is attached with the spring loaded archery accessory mounting bracket head 90.

In use, an archery accessory is coupled with the jaw assembly 52. A user activates the jaw assembly 52 and engages the archery accessory mounting bracket engagement surface 54 with the spring loaded archery accessory mounting head jaw engagement surface 50 of the spring loaded archery accessory mounting assembly 1. The user may have a second or more spring loaded archery accessory mounting assembly 1 attached to a user's belt, tree stand or tree.

Now referring to FIGS. 2A, 2B, 2C and 4, an alternate embodiment of a spring loaded archery accessory mounting bracket assembly 1 may include a spring loaded archery accessory mounting bracket base 60, at least a first fastener opening 12, a first radial indexing provision 145, and a belt receiver opening 32. A pair of tube receiving projections 61 extend from a rear of said archery accessory mounting bracket base 60. The pair of tube receiving projections 61 are sized to receive a tube. A three hundred sixty degree rotatable spring loaded archery accessory mounting head 90 includes an opening axial to and sized to engagement means 9, at least a first second radial indexing provision assembly 120, and archery accessory mounting bracket jaw engagement surface 50. The three hundred sixty degree rotatable spring loaded archery accessory mounting head 90 is rotatable about the axis of the coupling means 10. The first radial indexing provision 145 and at least a first second radial indexing provision assembly 120 may be of a ball and detent. In the alternate embodiment, this the at least first second indexing provision assembly 120 having a ball 130, a spring 135, and a pocket 140. The spring 135 is retained in the pocket 140, and the ball 130 is retained with the pocket 140 and rests on the spring 135.

Now referring specifically to FIG. 2A, illustrated are a three hundred sixty degree rotatable spring loaded archery accessory mounting head 90 having six radial indexing provision assemblies 120 displaced radially from the axis of the coupling means 10, and corresponding to the first indexing provisions 145 of the spring loaded archery accessory mounting bracket base 60.

Now referring specifically to FIGS. 2b and 2C, illustrated are a three hundred sixty degree rotatable spring loaded archery accessory mounting head 90 having two sets of radial indexing provision components of a ball 130, a spring 135, and a pocket 140 displaced radially from the axis of the coupling means 10, and corresponding to the first indexing provisions 145 of the spring loaded archery accessory mounting bracket base 60.

Assembly includes inserting the spring 135 into the pocket 140, and then inserting the ball 130 on top of the spring 135 in the pocket 140, biasing the ball away from the spring loaded archery accessory mounting bracket head 90. The axial center of the spring loaded archery accessory mounting bracket base 60 is aligned axially with the spring loaded archery accessory mounting bracket head 90. The coupling fastener 10 is inserted through a hole is the axial center of the spring loaded archery accessory mounting bracket base 60 and the engagement means 9 of the coupling means 10 is coupled with the axial center of the of the spring loaded archery accessory mounting bracket head 90. The coupling means 10 retains the spring loaded archery accessory mounting bracket base 60 axially with the spring loaded archery accessory mounting bracket head 90. In a first position, the spring 135 biases the ball 130 into the first indexing means 145, preventing unwanted movement of the spring loaded archery accessory mounting bracket head 90. An array of the first indexing means 145 are displaced radial about the axis of the coupling means 10.

In use, rotation of the spring loaded archery accessory mounting bracket head 90 forces the ball 130 to compress the spring 135 within the pocket 140, due to a diminishing depth of the first indexing means 145, in this case, a radial pocket, thus performing like a ball detent. As the spring loaded archery accessory mounting bracket head 90 is rotated about the axis of the coupling means 10, the ball 130 and the spring 135 will interact with the next radial first indexing means 145, wherein the spring 135 will force the ball 130 into the next first indexing means 145. Depending on spacing of the first indexing means 145 pockets and the overlapping thereof, the ball 130 may self-locate with the first indexing means 145. The ball 130 moves up and down within the pocket 140, compressing and relaxing the spring 135 as the ball crosses the high and low features of the pockets of the first indexing means 145, acting like a radial ball detent. In this embodiment, only rotation of the spring loaded archery accessory mounting bracket head 90 is required to choose the radial displacement of the spring loaded archery accessory mounting bracket head, wherein the former embodiment requires pulling-out-on, rotation, and release of the spring loaded archery accessory mounting bracket head 90 to choose radial displacement of the spring loaded archery accessory mounting bracket head 90.

Although the figures in this application illustrate a preferred embodiment of the present invention, alternative designs assembly methods may be accomplished by altering the number of components, manufacturing practices, tension alternatives, style or type of indexing pockets such as teeth, materials, size, and methods to accomplish the end result accordingly. An alternative embodiment of the invention discloses having the mounting base fully integrated with an end use article.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. The invention shall not be limited to archery accessories, the invention may be used in any field allowing the use of a mounting bracket and an attachment means as prescribed in the disclosure.

We claim:

1. An accessory mount comprising:
a base having a raised spindle, a first radial indexing provision and at least one fastener opening, said first radial indexing provision includes a plurality of cavities, said raised spindle extends from a front of said base, said first radial indexing provision is formed in said front of said base;
a spring;
an accessory mounting head includes an accessory mounting block and a second radial indexing provision, said second radial indexing provision includes a plurality of projections, said second radial indexing provision extends from a rear of said accessory mounting head, a spindle bore is formed in said rear of said accessory mounting head to rotatably receive said raised spindle; and
a coupling device engages said base with said accessory mounting head, said spring is retained on said coupling device, a coupling device counterbore is formed in a rear of said raised spindle to receive said coupling device and spring, wherein said spring biases said base toward said accessory mounting head, said second radial indexing provision mates with said first radial indexing provision.

2. The accessory mount of claim 1 wherein:
said base may be rotated relative to said accessory mounting head by loosening said coupling device, such that said first radial indexing provision is not engaged with said second indexing provision.

3. The accessory mount of claim 1 wherein:
a pair of tube projections extend from a rear of said base.

4. The accessory mount of claim 1 wherein:
a pair of belt receiver openings are formed through a rear of said base.

5. The accessory mount of claim 1 wherein:
at least one fastener is inserted through said at least one fastener opening for securing said base to an end use article.

6. An accessory mount comprising:
a base having a raised spindle, a first radial indexing provision, and at least one fastener opening, said first radial indexing provision includes a plurality of cavities, said raised spindle extends from a front of said base, said first radial indexing provision is formed in said front of said base;
an accessory mounting head includes an accessory mounting block and a second radial indexing provision, said second radial indexing provision includes at least two spring loaded balls, said accessory mounting block extends from a front of said accessory mounting head, said second radial indexing provision extends from a rear of said accessory mounting head, a spindle bore is formed in said rear of said accessory mounting head to rotatably receive said raised spindle; and
a coupling device engages said base with said accessory mounting head, said second radial indexing provision mates with said first radial indexing provision, a coupling device counterbore is formed in a rear of said raised spindle to receive said coupling device, wherein said base may be rotated relative to said accessory mounting head.

7. The accessory mount of claim 6 wherein:
a pair of tube projections extend from a rear of said base.

8. An accessory mount comprising:
a base having a raised spindle, a first radial indexing provision and at least one fastener opening, said first radial indexing provision includes a plurality of cavities, said raised spindle extends from a front of said base, said first radial indexing provision is formed in said front of said base, said at least one fastener opening is formed through said base;
an accessory mounting head includes an accessory mounting block and a second radial indexing provision, said second radial indexing provision includes a plurality of spring loaded balls, said accessory mounting block extends from a front of said accessory mounting head, said second radial indexing provision extends from a rear of said accessory mounting head, a spindle bore is formed in said rear of said accessory mounting head to rotatably receive said raised spindle; and
a coupling device engages said base with said accessory mounting head, said second radial indexing provision mates with said first radial indexing provision, a coupling device
counterbore is formed in a rear of said raised spindle to receive said coupling device, wherein said base may be rotated relative to said accessory mounting head.

9. The accessory mount of claim 8 wherein:
a pair of tube projections extend from a rear of said base.

10. The accessory mount of claim 8 wherein:
a pair of belt receiver openings are formed through a rear of said base.

11. The accessory mount of claim 8 wherein:
at least one fastener is inserted through said at least one fastener opening for securing said base to an end use article.

12. The accessory mount of claim 1 wherein:
a bracket head counterbore is formed in said front of said spring loaded archery accessory bracket to receive an outer diameter of said spring loaded archery accessory mounting bracket head.

13. The accessory mount of claim 6 wherein:
a bracket head counterbore is formed in said front of said spring loaded archery accessory bracket to receive an outer diameter of said spring loaded archery accessory mounting bracket head.

14. The accessory mount of claim 9 wherein:
a bracket head counterbore is formed in said front of said spring loaded archery accessory bracket to receive an outer diameter of said spring loaded archery accessory mounting bracket head.

15. The accessory mount of claim 6 wherein:
a dovetail is formed on said accessory mounting block.

16. The accessory mount of claim 9 wherein:
a dovetail is formed on said accessory mounting block.

\* \* \* \* \*